(12) United States Patent
Currier et al.

(10) Patent No.: US 11,431,824 B2
(45) Date of Patent: Aug. 30, 2022

(54) SERVER-SIDE CONTROL OVER NAVIGATION MODE IN WEB APPLICATION

(71) Applicant: ServiceNow, Inc., Santa Clara, CA (US)

(72) Inventors: Ryan Christopher Currier, Dublin, CA (US); Qian Zhang, San Diego, CA (US); Charles Reeves, Santa Clara, CA (US); Troy Azmoon, Carlsbad, CA (US)

(73) Assignee: ServiceNow, Inc., Santa Clara, CA (US)

( * ) Notice: Subject to any disclaimer, the term of this patent is extended or adjusted under 35 U.S.C. 154(b) by 147 days.

(21) Appl. No.: 16/402,359

(22) Filed: May 3, 2019

(65) Prior Publication Data

US 2020/0351382 A1    Nov. 5, 2020

(51) Int. Cl.
*H04L 67/00* (2022.01)
*G06F 3/0482* (2013.01)
(Continued)

(52) U.S. Cl.
CPC ............ *H04L 67/34* (2013.01); *G06F 3/0482* (2013.01); *G06F 16/9577* (2019.01); *H04L 67/303* (2013.01)

(58) Field of Classification Search
CPC .... G06F 16/958; G06F 16/972; G06F 40/106; G06F 40/14
See application file for complete search history.

(56) References Cited

U.S. PATENT DOCUMENTS 5,978,594 A   11/1999   Bonnell
6,321,229 B1  11/2001   Goldman
(Continued)

FOREIGN PATENT DOCUMENTS

AU    2015374061 B2    8/2017
EP    3241158 A1      11/2017
(Continued)

OTHER PUBLICATIONS

"Web Components," printed from http://developer.mozilla.org/en-US/docs/Web/Web_Components on Apr. 25, 2018.
(Continued)

*Primary Examiner* — Kevin T Bates
*Assistant Examiner* — Emad Siddiqi
(74) *Attorney, Agent, or Firm* — Fletcher Yoder PC

(57) ABSTRACT

A system configured to receive input declaring structure and operation of a web application, including declarations of components of the web application and a declaration of a navigation-mode setting of the web application, and to generate and store, in interrelated tables of a database, a representation of the web application, including references to underlying scripts interpretable to define structure and operation of the components, and including a property record defining the navigation-mode setting. Further, the computing system is configured to receive, from a client device, a request for the web application and to responsively generate based on the stored representation, and output, a data representation defining the structure and operation of the web application, including the navigation-mode setting, for use by the web browser to render the web application including applying the indicated navigation mode.

17 Claims, 10 Drawing Sheets

(51) Int. Cl.
   *H04L 67/303*   (2022.01)
   *G06F 16/957*   (2019.01)

(56) References Cited

U.S. PATENT DOCUMENTS

| | | | |
|---|---|---|---|
| 6,609,122 | B1 | 8/2003 | Ensor |
| 6,633,316 | B1* | 10/2003 | Maddalozzo, Jr. ......................... G06F 16/9566 709/224 |
| 6,678,887 | B1 | 1/2004 | Hallman |
| 6,816,898 | B1 | 11/2004 | Scarpelli |
| 6,895,586 | B1 | 5/2005 | Brasher |
| 7,027,411 | B1 | 4/2006 | Pulsipher |
| 7,028,301 | B2 | 4/2006 | Ding |
| 7,062,683 | B2 | 6/2006 | Warpenburg |
| 7,131,037 | B1 | 10/2006 | LeFaive |
| 7,170,864 | B2 | 1/2007 | Matharu |
| 7,392,300 | B2 | 6/2008 | Anantharangachar |
| 7,610,512 | B2 | 10/2009 | Gerber |
| 7,617,073 | B2 | 11/2009 | Trinon |
| 7,631,290 | B1* | 12/2009 | Reid ......................... G06F 8/38 715/764 |
| 7,689,628 | B2 | 3/2010 | Garg |
| 7,783,744 | B2 | 8/2010 | Garg |
| 7,877,783 | B1 | 1/2011 | Cline |
| 7,890,802 | B2 | 2/2011 | Gerber |
| 7,930,396 | B2 | 4/2011 | Trinon |
| 7,945,860 | B2 | 5/2011 | Vambenepe |
| 7,966,398 | B2 | 6/2011 | Wiles |
| 8,051,164 | B2 | 11/2011 | Peuter |
| 8,224,683 | B2 | 7/2012 | Manos |
| 8,266,096 | B2 | 9/2012 | Navarrete |
| 8,457,928 | B2 | 6/2013 | Dang |
| 8,478,569 | B2 | 7/2013 | Scarpelli |
| 8,554,750 | B2 | 10/2013 | Rangaranjan |
| 8,674,992 | B2 | 3/2014 | Poston |
| 8,689,241 | B2 | 4/2014 | Naik |
| 8,743,121 | B2 | 6/2014 | De Peuter |
| 8,887,133 | B2 | 11/2014 | Behnia |
| 8,983,982 | B2 | 3/2015 | Rangarajan |
| 9,239,857 | B2 | 1/2016 | Trinon |
| 9,508,051 | B2 | 11/2016 | Falk |
| 9,535,674 | B2 | 1/2017 | Cooper |
| 9,535,737 | B2 | 1/2017 | Joy |
| 9,557,969 | B2 | 1/2017 | Sharma |
| 9,684,882 | B2 | 6/2017 | Azmoon |
| 9,792,387 | B2 | 10/2017 | George |
| 2003/0014442 | A1* | 1/2003 | Shiigi ......................... G06F 8/20 715/255 |
| 2004/0015476 | A1* | 1/2004 | Twaddle ......................... G06F 16/972 |
| 2005/0273758 | A1 | 12/2005 | Long |
| 2006/0085766 | A1* | 4/2006 | Dominowska ......... G06F 16/954 715/854 |
| 2006/0271858 | A1* | 11/2006 | Yolleck ................. G06F 16/954 715/779 |
| 2008/0034071 | A1 | 2/2008 | Wilkinson et al. |
| 2014/0331124 | A1* | 11/2014 | Downs ................. G06F 40/106 715/243 |
| 2015/0310124 | A1* | 10/2015 | Ben-Aharon ......... G06F 40/106 715/205 |
| 2016/0019194 | A1* | 1/2016 | Mondal ................. G06F 1/329 715/234 |
| 2016/0188134 | A1 | 6/2016 | Azmoon et al. |
| 2017/0286885 | A1 | 10/2017 | Azmoon |
| 2017/0308859 | A1 | 10/2017 | Azmoon et al. |
| 2017/0329636 | A1 | 11/2017 | Azmoon |

FOREIGN PATENT DOCUMENTS

| | | |
|---|---|---|
| EP | 00455661-0001 | 2/2018 |
| EP | 00455661-0002 | 2/2018 |
| EP | 00455661-0003 | 2/2018 |
| EP | 00455661-0004 | 2/2018 |
| EP | 00455661-0005 | 2/2018 |
| EP | 00455661-0006 | 2/2018 |
| EP | 00455661-0007 | 2/2018 |
| EP | 00455661-0008 | 2/2018 |
| WO | 2017184872 A1 | 10/2017 |

OTHER PUBLICATIONS

Christopher Heng, "How to Make Links Open in a New Window or Tab," thesitewizard.com, printed from http://www.thesitewizard.com/html-tutorial/open-link-in-new-win . . . , Nov. 2018.

* cited by examiner

SERVER-SIDE CONTROL OVER NAVIGATION MODE IN WEB APPLICATION

BACKGROUND

A typical web application consists of a number of elements arranged hierarchically or in another manner to facilitate rendering by a web browser application running on a client device. The web application can be written in hypertext markup language (HTML) or another suitable markup language that the browser is configured to render, including tags and other content defining or corresponding with elements of the web application. Further or alternatively, aspects of the web application can be defined dynamically using JavaScript or other scripting languages. For instance, a set of JavaScript code could be written to dynamically define the general structure or shell of a web application and to then use context (such as stored user information or user input) to obtain or build other elements of the web application. A web browser could obtain the JavaScript code from local storage or by request from a server (e.g., by an application programming interface (API) call) and, in accordance with the code, could render the web application.

A developer may devote great time and expense to developing such a web application, including developing the underlying components and overall structure of the web application. Given this, the developer may benefit from repurposing the web application or portions of the web application. For instance, the developer could benefit from making the web application available for use by various customers such as enterprises or individual users. In practice, however, these customers may have divergent needs and differing uses for the web application.

SUMMARY

A representative web application could be configured to present sequential pages of application content. For instance, the web application as rendered by a web browser could define an in-application content pane for presenting pages of application content, and those pages or other aspects of the web application could define one or more hyperlinks that a user could click or otherwise actuate in order to navigate from presentation in the content pane of one page of application content to presentation in the content pane of another page of application content.

Note that the content pane at issue here is part of the web application itself and is distinct from a window or other container in which the web browser renders the web application. A web browser executed on a client device could occupy a window defined on a display of the client device and could render various web applications within that window, such as within respective tabs of the browser window. The content pane at issue here, however, is one defined by and within a given such web application. Thus, a web browser could render the web application within a browser tab, and the web application as so rendered could define a content pane in which the browser could render various pages of application content in accordance with the web application.

When the web application as rendered by the web browser is presenting a page of application content in its content pane and a user clicks on a hyperlink to navigate to a new page of application content, the web application could cause the web browser to retrieve from a server or local storage a set of data that defines the new page of application content. And the web browser could render and thus present the new page of application content in the in place of the currently presented page of application content in the content pane.

The web application could be set to apply one of various possible navigation modes as the web application thus transitions through presentation of various such pages of application content. Without limitation, examples of these navigation modes include tab-based navigation and single-page-based navigation.

With tab-based navigation, the web application could present each page of application content in a respective tab container defined within the web application's content pane, each tab container having a respective body portion that encompasses the application content and a respective a header portion that is labeled with a respective page title and that is user-selectable regardless of whether the body of the tab is currently shown or hidden. As the web application presents each new page of application content in a new tab container within the web application's content pane, the web application could present the new tab container with its body in the foreground and thus with the encompassed new page of application content in the foreground, and the web application could maintain earlier presented tab containers in the background within the content pane, with their bodies hidden but with their headers accessibly shown for user selection.

Conveniently, this tab-based navigation mode could enable a user to easily multi-task back and forth between the pages of application content by simply selecting desired tab headers within the web application's content pane. For instance, while viewing a first presented page of application content in a first tab container within the content pane, the user might easily switch to a second, earlier-presented page of application content in a second tab container within the content pane by clicking on the header of the second tab container and thereby causing the web application to (i) show the body of that second tab container and thus the second page of application content and (ii) hide the body of the first tab container and thus the first page of application content. And the user might then easily switch back to viewing the first page of application content, by simply clicking on the header of the first tab container, thus causing the web application to (i) show the body of that first tab container and thus the first page of application content and (ii) hide the body of the second tab container and thus the second page of application content.

As the web application sequentially progresses through presentation of numerous such pages of application content, the web application could thus maintain presentation of numerous corresponding tab headers within the content pane, to enable convenient user-switching back and forth between the various pages of application content. The web application could present these various tab headers side-by-side, in multiple layers, nested, or in any other desired manner. Further, with this navigation mode, the web application could maintain the body of each tab container, including the encompassed page of application content, in the web application's Document Object Model (DOM), to enable quick switching back and forth between presentation of pages of application content by simply showing and hiding the bodies of various tab containers.

With single-page-based navigation, on the other hand, the web application could present each new page of application content as a full replacement for an earlier presented page of application content within the web application's content pane, without maintaining the earlier presented page in a background tab container selectable by a user and without maintaining the earlier presented page in the web application's DOM. Thus, with single-page-based navigation, the user may not be able to easily multi-task back and forth between pages of application content, since earlier presented pages of application content would not be easily accessible in background tab containers with user-selectable headers.

In a variant of single-page-based navigation, the web application could also present a breadcrumb trail as an ordered list of hyperlinks to previously presented pages of application content. Provided with such a breadcrumb trail, a user could then click on any desired hyperlink in the breadcrumb trail in order to navigate to the associated previously-presented page of application content.

But such a breadcrumb trail may still not facilitate the multi-tasking that tab-based navigation facilitates, because, once the user clicks on a hyperlink in the middle of the breadcrumb trail and the web application transitions to present the associated page of application content, the web application may truncate the breadcrumb trail and no longer include hyperlinks to pages of application content that were presented after the now-currently presented page of application content. Further, even if the breadcrumb trail were to maintain hyperlinks to pages of application content that were presented after the currently presented page of application content, transitioning to each such other page of application content may require adding the page of application content back into the web application's DOM and newly rendering the page.

Certain customers of such a web application or variants thereof may benefit from having the web application use one or another of these navigation modes. For example, a customer who would use the web application in a context where the customer would do more multi-tasking between pages of application content may benefit from having the web application use the tab-based navigation mode. Whereas, a customer who would use the web application in a context where the customer would not do such multi-tasking may benefit from having the web application use the single-page-based navigation mode and from not having numerous tabs shown in the user interface.

It could thus be beneficial for a developer of such a web application or variants thereof to be able to selectively configure to the web application to use one navigation-mode or another, so that when the web application gets delivered to a web browser, the web application would be set to apply the desired navigation-mode. For instance, for some customers, it could be beneficial for the developer to be able to configure the web application to use the tab-based navigation, so that the web application as rendered by a web browser executing on a client device would operate with tab-based navigation. And for other customers, it could be beneficial for the developer to be able to configure the web application to use single-page-based navigation, so that the web application as rendered by a web browser executing on a client device would operate with single-page-based navigation.

Disclosed herein is a mechanism to help facilitate these. In accordance with the disclosure, a computing system could include a database that holds interrelated records cooperatively defining a structure and operation of the web application, including a record defining a navigation-mode setting of the web application. Further, the system could include a web server that is configured to receive user input (e.g., web-developer input) defining the structure and operation of the web application, including user input defining the navigation-mode setting, and to responsively establish the interrelated records. And the web server could be configured to receive from a client device a request for the web application and to responsively generate based on the interrelated records, and output to the client, a data representation of the web application, such as markup and/or JavaScript that represents the structure and operation of the web application, including the navigation-mode setting of the web application.

Accordingly, in a first example embodiment, a computing system could include a database and a web server.

The database could include a plurality of interrelated records cooperatively defining a hierarchical arrangement of components of a web application, including references to underlying scripts interpretable to define structure and operation of the components of the web application, and a property record defining a navigation-mode setting of the web application.

And the web server could be configured to receive, from a client device, a request for the web application, and, responsive to the request, (i) query the database to ascertain a component tree-structure representing the hierarchical arrangement of the components of the web application and to ascertain, from the property record, the navigation-mode setting of the web application, (ii) generate a data representation of the ascertained hierarchical arrangement of the components and the navigation-mode setting of the web application, the data representation including markup (e.g., HTML) and/or code (e.g., JavaScript or other scripts), and (iii) output the generated data representation to the client device for use by the client device to render the web application and to control a navigation mode of the web application in accordance with the navigation-mode setting.

Further, the web server could be configured to receive user input declaring the navigation-mode setting of the web application, and responsive to the user input, generate and store in at least one table of the database the property record defining the navigation-mode setting of the web application. For instance, the web server could be configured to provide a user interface through which to receive the user input declaring the navigation-mode setting of the web application.

In line with the discussion above, the navigation-mode setting could control whether, as the web application presents sequential new pages of application content, the web application operates with tab-based navigation or rather with single-page-based navigation. Operating with tab-based navigation rather than single-page-based navigation comprises (a) presenting each sequential page of application content in a respective tab container having a respective tab header and (b) maintaining earlier presented pages of application content in respective tab containers with tab headers accessibly presented for user selection, allowing a user to multitask back and forth between the pages of application content by selecting associated tab headers. Whereas, operating with single-page-based navigation rather than tab-based navigation comprises presenting each sequential page of application content in place of an existing page of application content without maintaining the existing page of application content in tab container.

In a second example embodiment, a method could include a web server receiving input declaring structure and operation of a web application, including declarations of component hierarchy between components of the web application and a declaration of a navigation-mode setting of the web application. And the method could include, responsive to the input, generating and storing, cooperatively in a plurality of tables of a database, a representation of the web application, including references to underlying scripts interpretable to define structure and operation of the components and including a property record that defines the navigation-mode setting of the web application.

Further, the method could include the web server receiving from a client device, a request for the web application. And the method could include the web server responding to the request as noted above, so as to output the generated markup and/or JavaScript for use by a web browser on the client device to render the web application and to control the navigation mode in accordance with the navigation-mode setting.

In a third example embodiment, an article of manufacture may include a non-transitory computer-readable medium, having stored thereon program instructions that, upon execution by a computing system, cause the computing system to perform operations in accordance with the second example embodiment.

In a fourth example embodiment, a system may include various means for carrying out each of the operations of the other example embodiments.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, numerous variations are possible. For instance, structural elements and process steps can be rearranged, combined, distributed, eliminated, or otherwise changed, while remaining within the scope of the embodiments as claimed.

DETAILED DESCRIPTION

Figure 1:
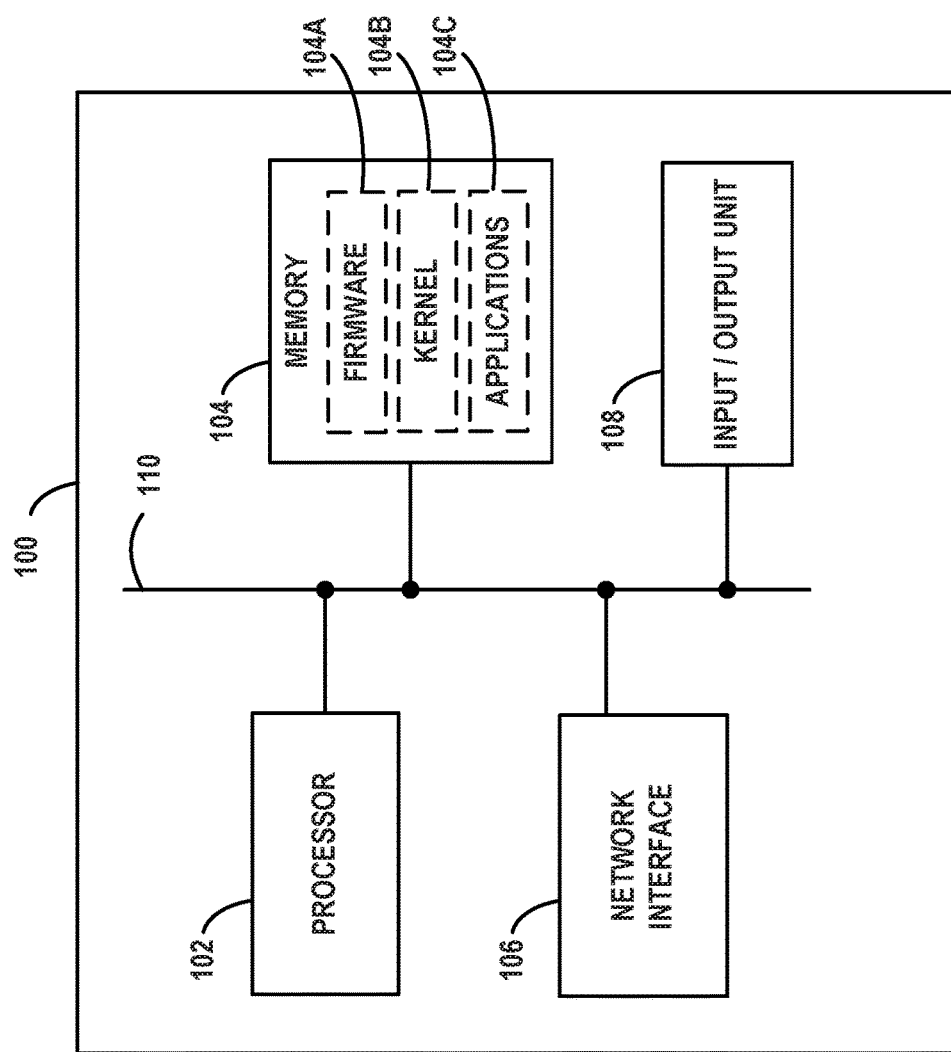
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
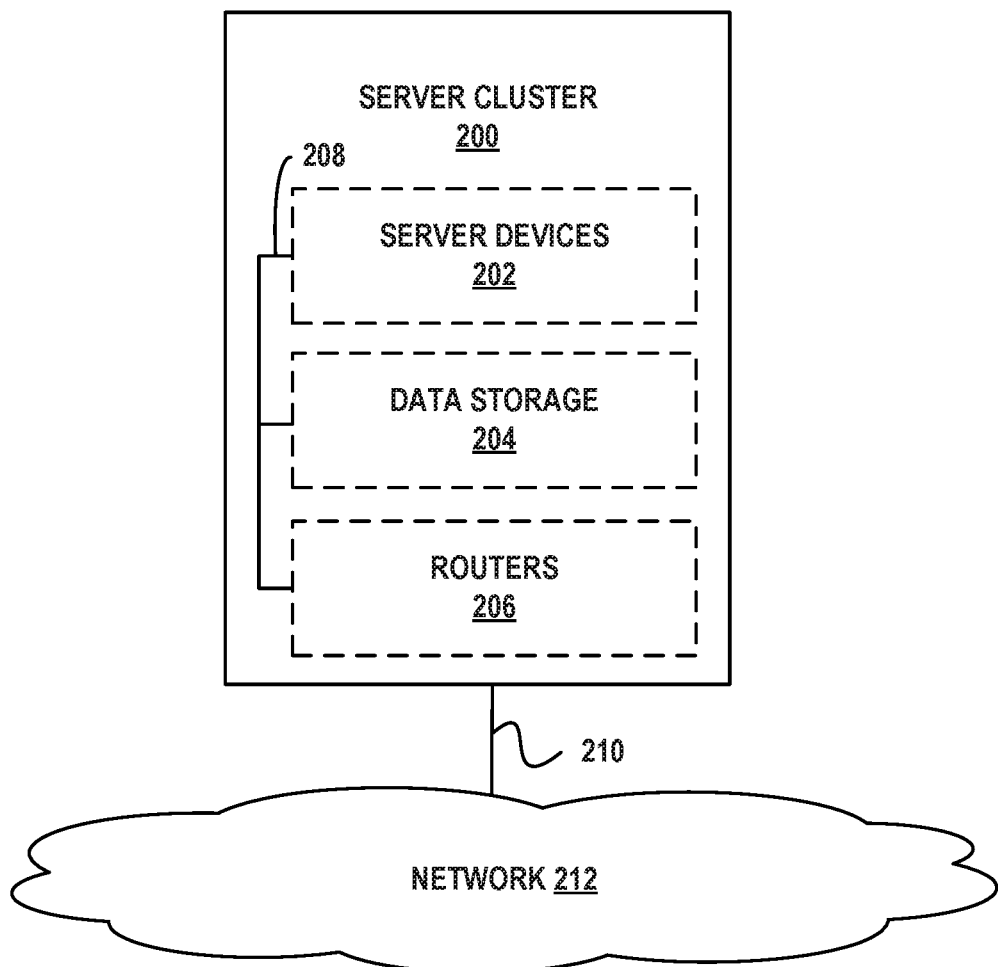
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages.

III. Example Remote Network Management Architecture

Figure 3:
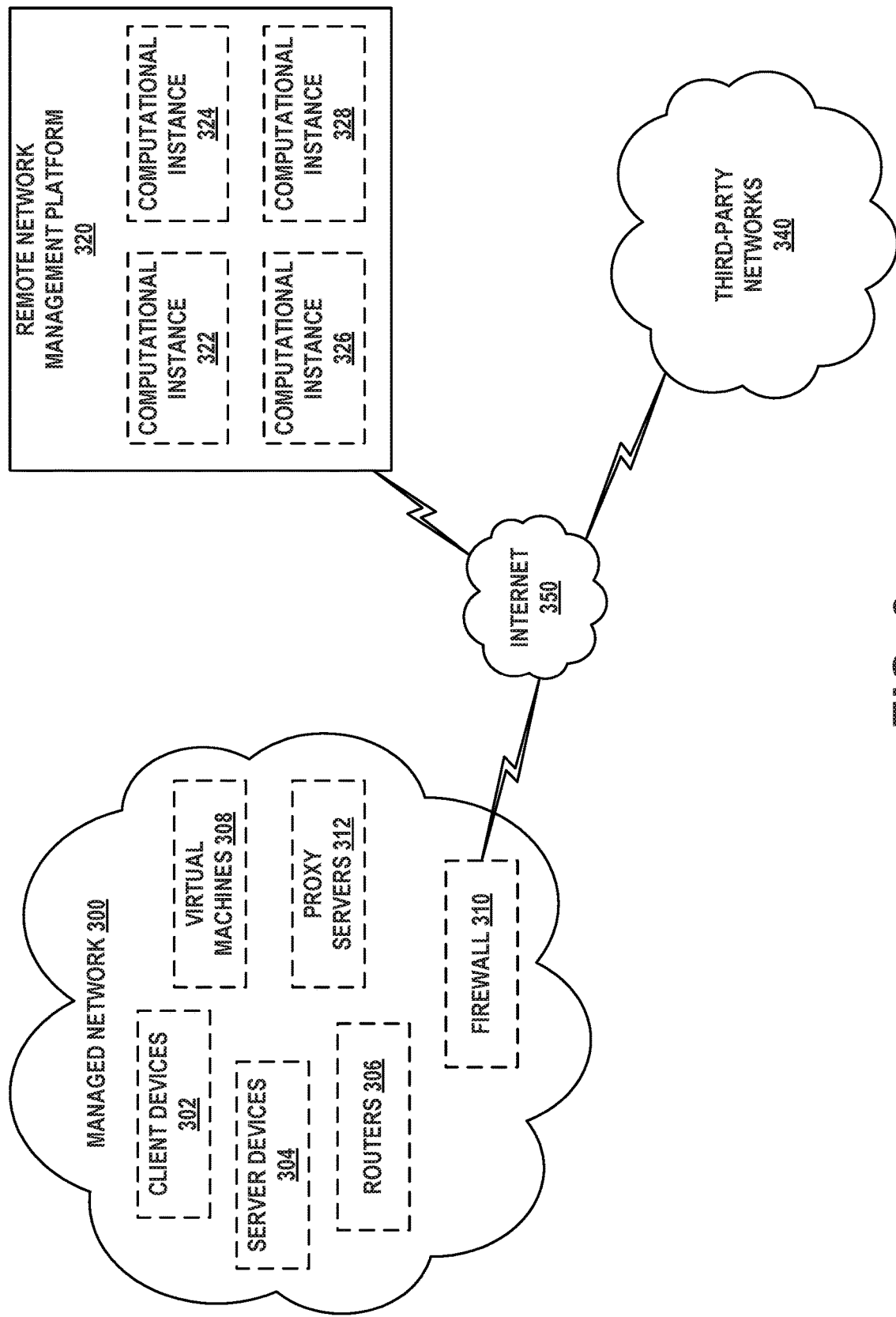
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® AZURE®. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
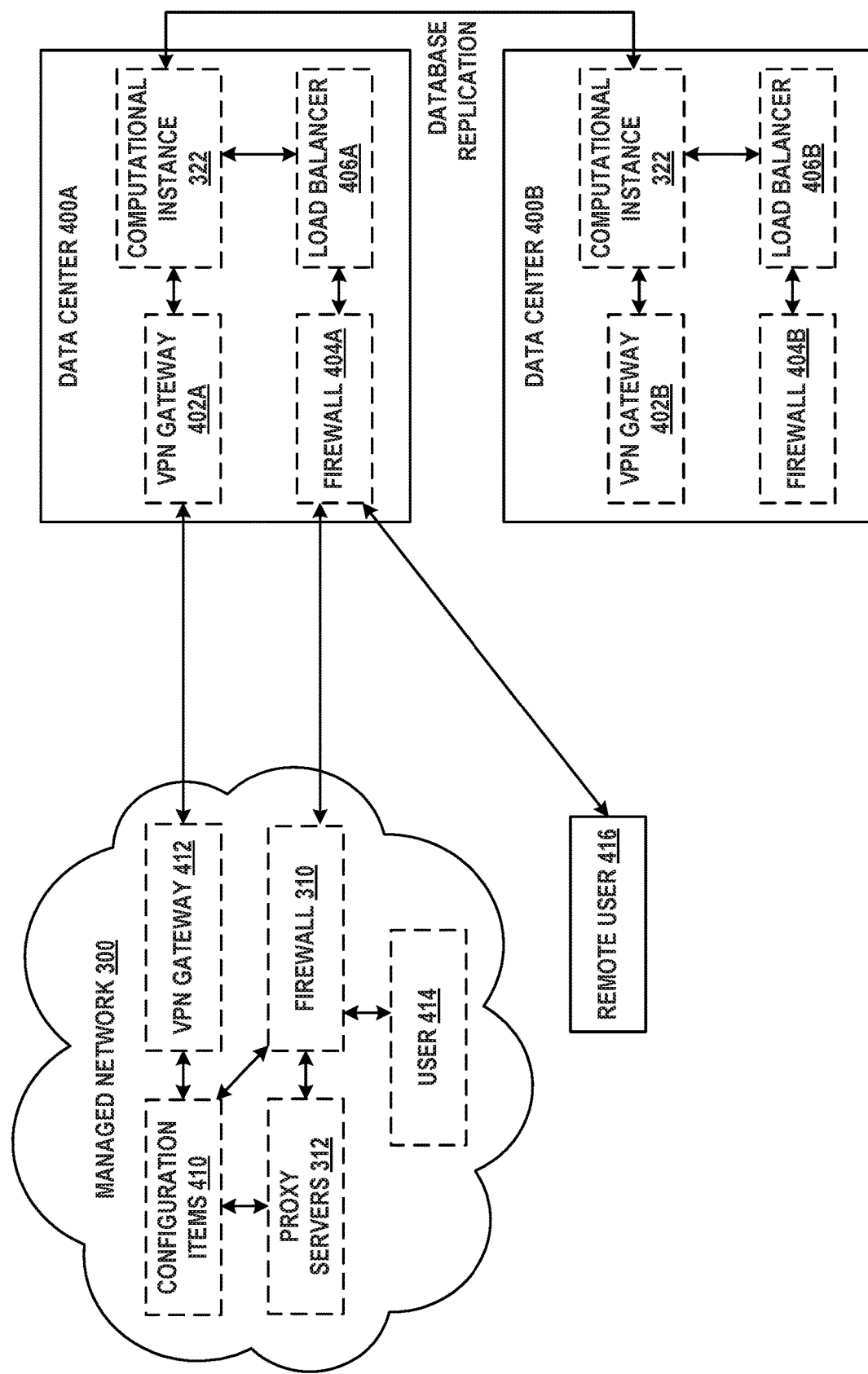
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
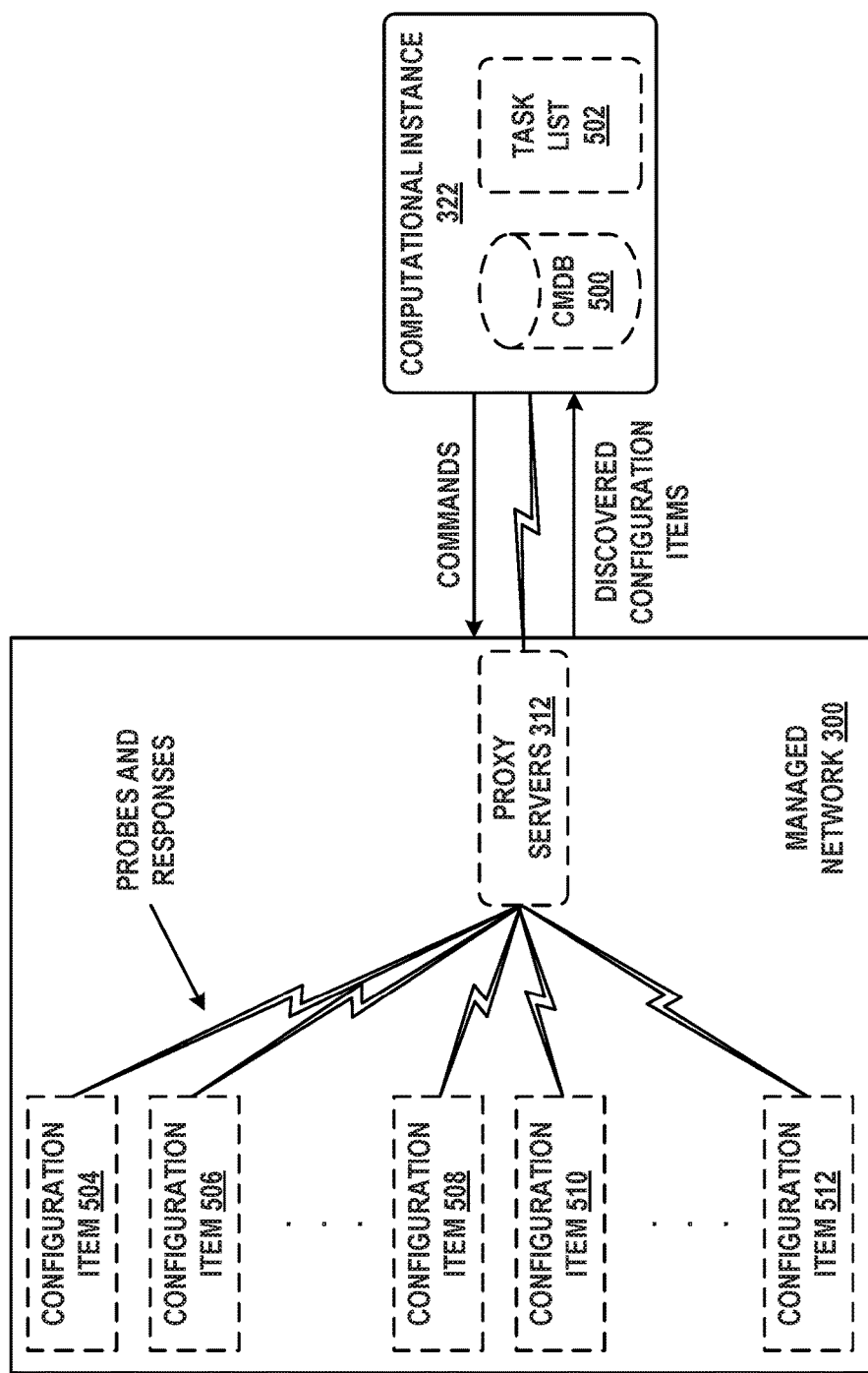
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
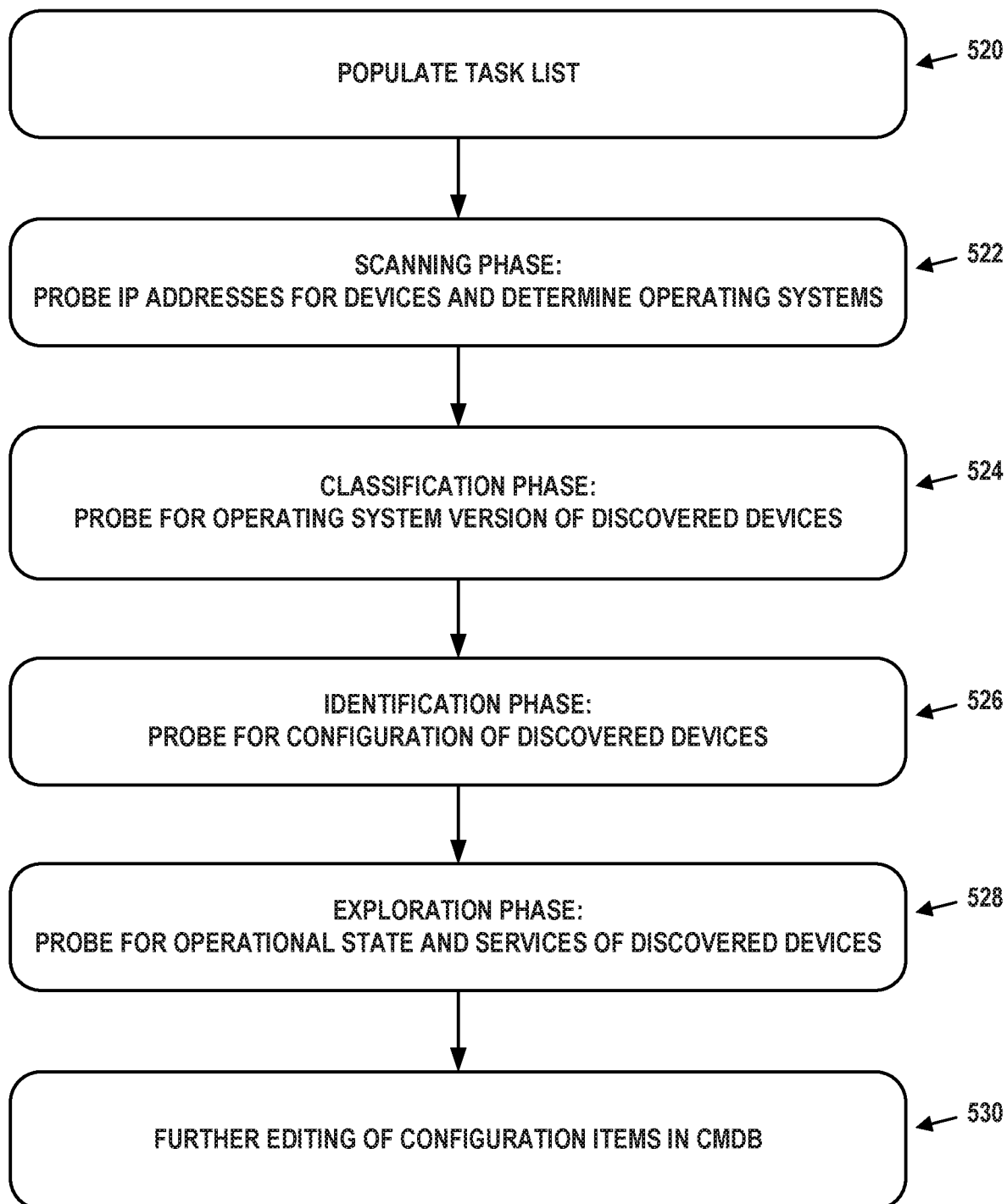
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. Example Server-Side Control of Web-Application Navigation Mode

As noted above, software applications may be developed by individual departments within an enterprise. Such applications could include or take the form of web applications, including one or more web pages configured to be rendered by web browsers executing on client devices to facilitate dynamic interaction with end users. For instance, an aPaaS system hosted remotely from the enterprise could serve web applications to client browsers.

Through interaction with the aPaaS system or other system, a software developer could compose such web applications, defining their structure and operation, and the system could then store the web applications for retrieval and rendering. Further, as discussed above, the developer could selectively set the navigation mode of the web application. And the system could likewise store that navigation-mode setting and could deliver a representation of the navigation-mode setting to the client for use by a browser to control navigation mode within the web application in accordance with the setting.

A representative system could make use of reusable custom web components. Each such component could have underlying scripting (e.g., JavaScript) that defines the structure and operation of the component and exposes an API for use by a web developer. A developer could thus design a web application by declaratively composing simple markup (e.g., HTML or XML) that defines a hierarchical arrangement of such components and by specifying associated functionality of the application, such as a navigation-mode setting of the application.

Such a system could be provided by a server or server cluster, as in the aPaaS discussed above, and the system could be configured to support delivering the components and associated scripts to a browser upon request, to enable the browser to render the web application.

Further, an example system could include an application-builder subsystem that enables such a web application to be represented in a database model on a server, so as to facilitate efficient generation of associated markup documents and/or JavaScript objects for delivery to a browser.

For instance, a database server application executing on a computing device could maintain a relational database (e.g., a SQL database as discussed above) with a schema through which a set of database records cooperatively describe the structure and operation of the web application, including the hierarchical arrangement of components and the navigation-mode setting. And a web server could be configured to generate and store such records in response to web-developer input, and to generate, for output to a web browser, a data representation of the web application based on the stored records.

Figure 6:
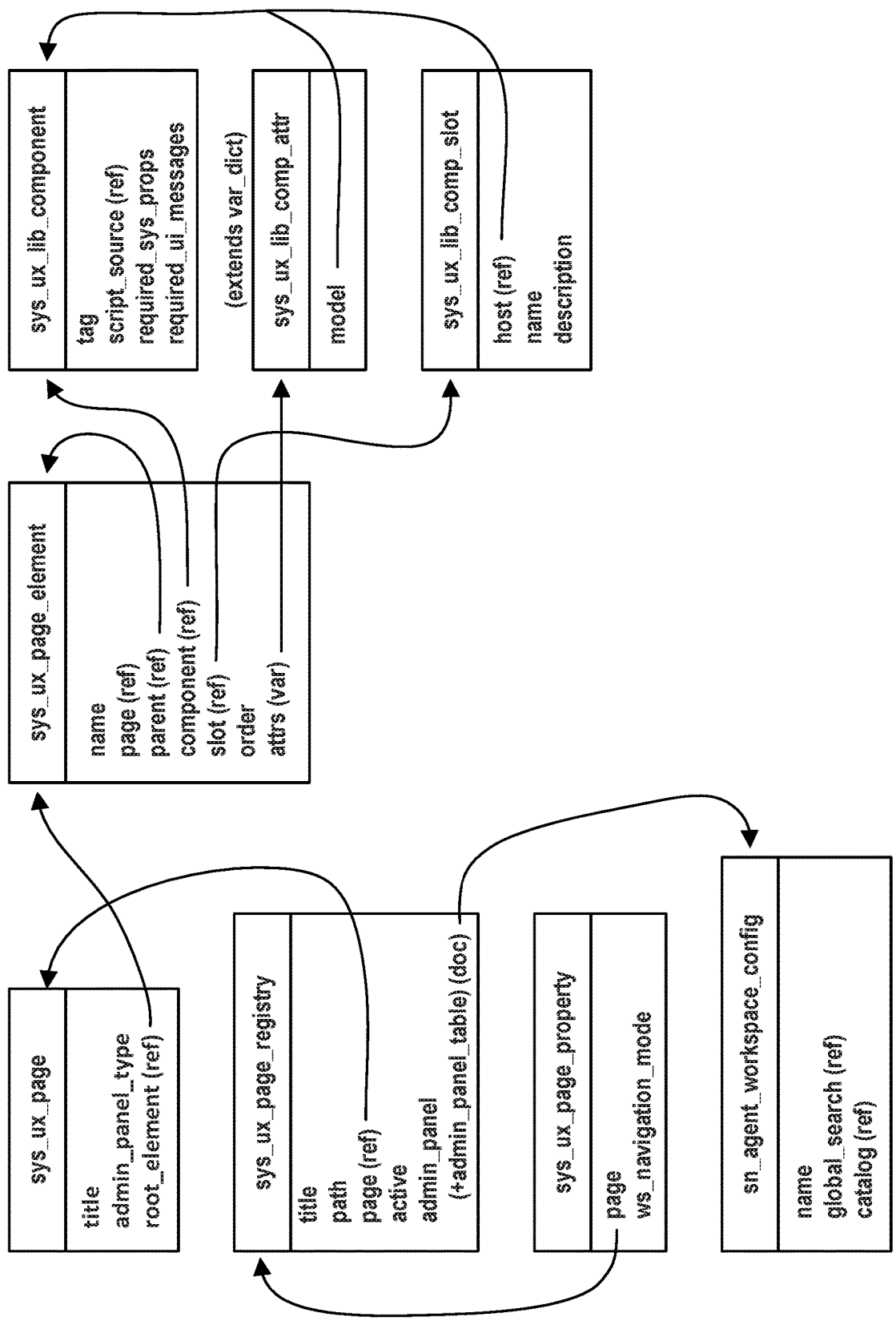
FIG. 6 depicts a portion of a database schema for use with example embodiments.

FIG. 6 depicts an example database schema, showing how the application-builder subsystem could represent a web application with a group of interrelated database tables, defining a plurality of interrelated records.

Shown on the left side of FIG. 6 are tables involved in describing an example of page registration, to establish a root element of a web application and to associate one or more Uniform Resource Locators (URLs) or the like with bespoke configurations of the web application. And shown on the right side of FIG. 6 are tables involved in describing web application structure, through a plurality of interrelated records cooperatively defining a hierarchical arrangement of components of the page, including references to underlying scripts interpretable to define structure and operation of the components.

In the example arrangement shown, "sys_ux_page" acts as a container record, pointing to a root element in a page structure. "Sys_ux_page_registry then associates a page record (the structure) with a URL path/site name and a bespoke configuration record. FIG. 6 illustrates this by way of example as a document field corresponding with an example "admin_panel" database record. But the page could just as well be registered to be associated with other URLs or paths.

More generally, the system could register URLs or other paths to each be database-associated with respective sys_ux_page record, so as to establish an associated web application configuration for the URL, and each URL registration record can have a settings record associated with it, conforming to a bespoke schema specified by the sys_ux_page record, unique to that sys_ux_page record. This enables multiple URLs to make use of a given web application structure/configuration, with the web applications differing from each other in terms of their underlying respective configuration data relevant to their URL.

Further, as shown, the example database schema includes a "sys_ux_page_property" table that includes a "page" field pointing to a sys_ux_page_registry record and that further includes a "ws_navigation_mode" property. With this arrangement, the ws_navigation_mode property could drive the navigation mode of a given web application.

Each root element web application page (of a sys_ux_page table) then has a database relationship with a hierarchy of page elements (sys_ux_page element records). Each page element points to its parent element via a reference field, thereby representing the structural hierarchy, so that a database query can readily find each element that is a child of a given element, thus enabling efficient searching to establish a full tree representation of the page. Thus, the relational database records cooperatively describe a DOM tree representation of the page.

Further, each page element could be an instance of a component node, specifying the underlying source file, tag name, slots, attributes, and actions (events) that enable communication with other nodes in the hierarchy. For instance, each component could specify one or more slots where a child component could be associated in a shadow-DOM. And each component could specify one or more attributes and one or more properties.

More particularly, in the example shown, each page element record includes a reference to a component definition record ("sys_ux_lib_component"), and the component definition record in turn includes a reference to its underlying script source file as well as fields for defining properties and other aspects of the component. Each page element record could include various attributes, by reference to one or more attribute records. Further, as a component could use a shadow-DOM to manifest its internal structure, the component definition could specify a set of slots to help indicate where child elements should be rendered in the shadow-DOM. When a page element is created and put into a page structure, the system could record in the page element a reference to a slot of its parent component's definition that it should be bound to, as a slot field referencing a slot definition record ("sys_ux_lib_comp_slot").

In a representative implementation, the application-builder subsystem could further provide a user interface through which a web developer could configure such a web application. For instance, the user interface could present the web developer with a menu of established web components and could enable the web developer to select components to include in a web application and to define the hierarchical relationship between the selected components. Further, the user interface could present the web developer with a menu of available navigation-mode settings, such as tab-based navigation and single-page-based navigation, and could enable the web developer to select one of the navigation mode settings to be the navigation-mode setting for the web application. And the application-builder subsystem could then store the associated web-application description as metadata in database tables as noted above.

As the web developer makes such selections and designations, the page-builder subsystem could then correspondingly generate the database records that cooperatively describe the designed web application, to facilitate later generating and delivering markup and/or JavaScript representing the web application, including a JavaScript object that indicates the navigation-mode setting of the web application. And the application-builder subsystem could store the generated records in the database.

Through this or other arrangements, the present system could enable the structure and operation of a web application to be described declaratively, with aspects of the page being represented and interrelated with metadata, establishing what components should be rendered and how the components and the web application generally should be configured and should operate. By storing the description of the web application as metadata in a database, the system could then readily determine the structure and operation of the web application upon request and could responsively generate and deliver associated markup and/or code for use by a client browser to render the web application.

Further, a web server application executing on a computing device could be configured such that when it receives from a browser a request for a web application at a particular address (e.g., a particular URL), the web server application responsively queries the database to obtain the database records that cooperatively describe the web application, the web server application generates markup and/or code in accordance with that description, and the web server application transmits the generated markup and/or code to the browser for use by the browser to render the web application.

By way of example, when the system receives from a browser a request for a web application designated by a URL or the like, the system could query various host provider extensions and thereby determine that the request belongs to the application-builder subsystem (e.g., by finding that the URL is registered to a particular sys_ux_page), and the system could therefore route the request to the application-builder subsystem for handling. A host provider for the application-builder subsystem could then construct a request and pass the request to an application-processor class, which could then build and output markup and/or code for rendering and/or interpretation by the browser.

For instance, a server implementing the application-processor could perform database queries to build a tree representation of the web application as discussed above and to determine the navigation-mode setting of the web application, and could translate that information into a data representation, such as markup and/or code (e.g., JavaScript code), representing (e.g., defining) the web application. The server could then deliver a response to the browser, providing the browser with the data representation for use by the browser to render the web application.

In a representative implementation, an initial request from a client browser for a web application could cause the server to responsively query the database and generate and output for transmission to the browser a data representation that defines a shell of the web application and that defines certain core web-application functionality. For instance, this data representation could define where the browser should render particular core web-application features, examples of which could include a web application header, a web application side bar, and a web application content pane where pages of application content can be rendered, among other possibilities. And the data representation could include an object (e.g., a JavaScript object) or other data that specifies or otherwise indicates the navigation-mode setting of the web application.

Thus, upon receipt of this data representation in response to an initial request for the web application, the browser could use the data representation as a basis to render the web application. For instance, if the data representation comprises JavaScript code and HTML markup, the browser could interpret the JavaScript code and render the HTML markup in order to present the web application to a user.

To accordingly render the web application, the browser could build a data model for the web application. In particular, the browser could construct the data model as a hierarchy of JavaScript objects corresponding with various objects of the web application and could store or otherwise indicate data associated with each such web application object. For instance, the JavaScript objects of the data model could indicate, for each object of the web application, data such as object type, title, ID, value, status, content, and the like. Further, the data representation from the server could indicate correspondence between these JavaScript objects of the data model and various objects of the web application.

The data model of the web application could thus include data associated with the web application object itself, including for instance a specification the navigation-mode setting of the web application. Further, the data model of the web application could include data associated with objects within the web application, such as a web application header, a web application side bar, and web application content window. And for each such object of the web application that hierarchically encompasses other objects, the data model could include data associated with each encompassed object. Ultimately, the data model could thus define a hierarchical data model tree representing data associated with various objects of the web application, including the web application itself.

The data representation that the server initially provides to the browser could itself indicate some or all of the data for the browser to store in the data model for the web application. Alternatively or additionally, JavaScript code or other aspects of the data representation could cause the browser to make one or more API calls (e.g., Asynchronous JavaScript and XML (AJAX) calls) to retrieve data records that the browser may then translate into data model records for the web application. For instance, the browser could receive raw data records from a server, and the browser could build some or all portions of the data model based on that raw data, generating JavaScript objects corresponding with associated objects of the web application, and populating those JavaScript objects with associated data.

Further, to render the web application in the example implementation, also perhaps in accordance with the data representation from the server, the browser could build a DOM of the web application. For instance, the browser could use an MVC architecture to translate content of the data model into DOM objects and/or could automatically generate particular DOM objects having attributes and properties in line with content of the data model. Alternatively or additionally, the browser could generate some or all of the DOM based on associated HTML. In any event, the DOM of the web application could define a DOM tree, hierarchically representing objects of the web application The DOM of the web application could thus define the hierarchical structure of the web application and its elements, represented as objects, and could define behavior and attributes of those objects. For instance, the DOM could represent these objects with a DOM tree structure, where the nodes of the DOM tree represent the various objects of the web application and the hierarchical arrangement of the nodes represents the structure of the web application. To complete rendering of the web application, the browser could then construct a render tree based on the web application DOM, where the render tree comprises a hierarchy of typically rectangular portions of the web application with dimensions suitable for layout on a display, and the browser may then lay out and paint the render tree as a user interface on the display.

In the example implementation, the data representation from the server could also cause the browser to process user login. For instance, the browser could present a login dialog to receive user credentials and/or the browser may have cached user credentials. Per the data representation from the server, the browser may make one or more API calls to a server to log in the user, so as to facilitate tailoring the web application to the user's circumstances, such as presentation of containers and other objects related to the user's job, account, or the like. For instance, depending on the user, the sever may configure the web application in one way or another, such as with one navigation-mode setting or another.

As noted above, the web application as initially rendered by the browser could define an in-application content pane for presenting pages of application content. Further, the web application could present one or more hyperlinks that a user could click in order to cause the browser to acquire and present new pages of application content within this content pane of the web application.

Each such hyperlink could specify a data-set identifier for a new page of application content. And the data representation from the server could cause the browser to respond to user-clicking of such a hyperlink by requesting and obtaining from the server the identified data set and then rendering within the web application's content pane the new page of application content. For instance, in accordance with the data representation from the server, the browser could make an API call to retrieve the data set, and the browser could translate the data set into supplemental data model records and DOM nodes for the web application and could accordingly render that new page within the content pane.

In line with the discussion above, the data representation from the server could further define a navigation-mode setting of the web application. For instance, the data representation could include an object (e.g., JavaScript object) that defines a navigation-mode property having a value corresponding with the navigation-mode setting. In response to this navigation-mode setting, the browser could thus cause the web application to operate with the associated navigation-mode. For instance, this navigation-mode setting could cause the web application to operate with tab-based navigation or rather with single-page-based navigation.

Figure 7:
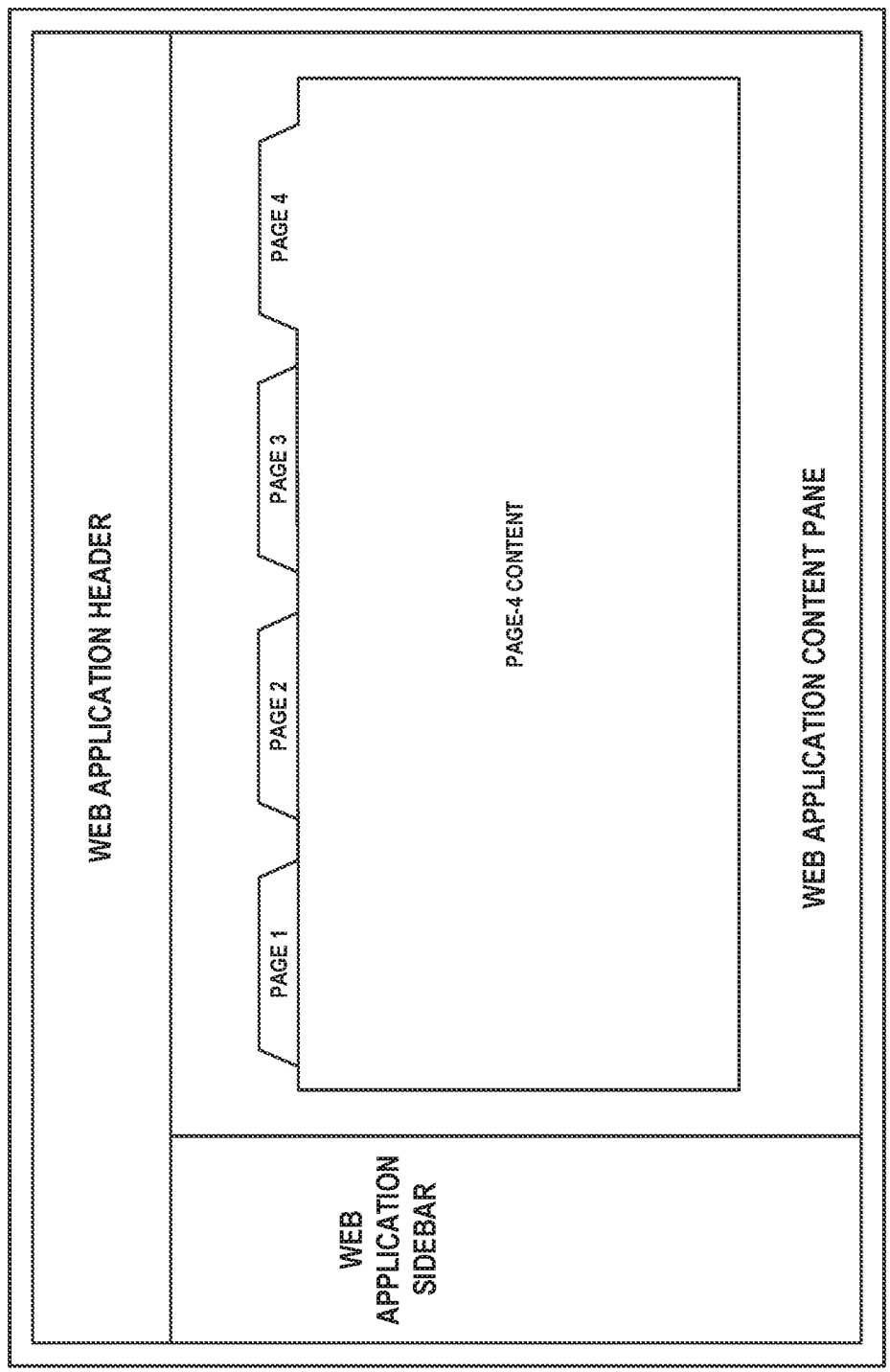
FIG. 7 is an illustration of an example web application with tab-based navigation.
Figure 8:
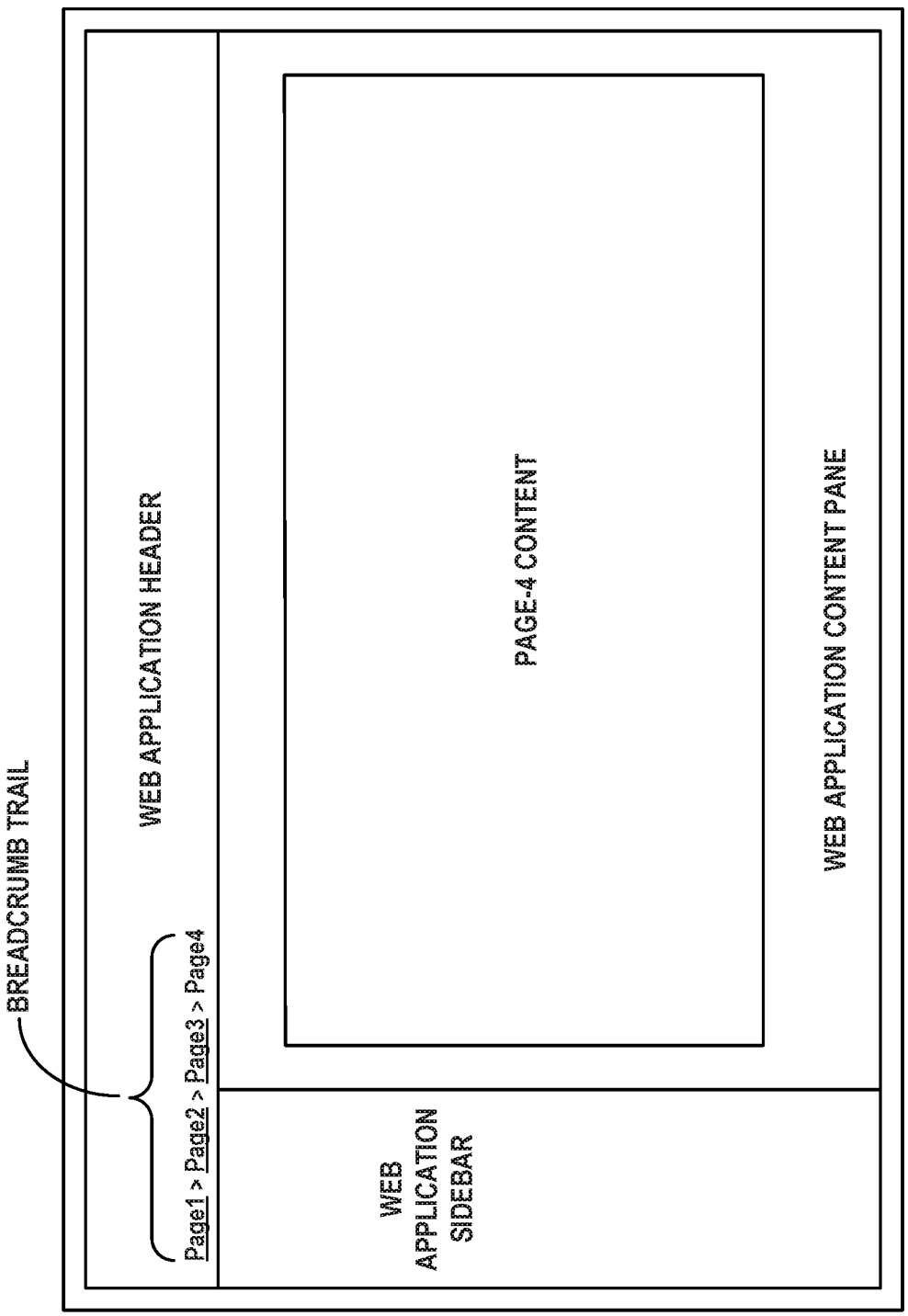
FIG. 8 is an illustration of an example web application with single-page-based navigation.

FIGS. 7 and 8 depict examples of a web application in use, to help illustrate these different navigation-mode settings. Both figures depict a simplified web application that might be rendered within a browser window (e.g., within a tab of a browser), having the shell elements noted above, including a web application header, a side bar, and a content pane. FIG. 7 illustrates how the web application might appear when applying tab-based navigation, and FIG. 8 illustrates how the web application might appear when applying single-page-based navigation.

As to FIG. 7, with tab-based navigation, the content pane of the web application presents each of various pages of application content in a respective tab container defined within the web application's content pane and having a body portion and a user-selectable header portion. Namely, as noted above, each tab container defined within the web application's content pane could include a body that encompasses an associated page of application content, and a header that a user could select in order to cause the web application to present the body of the that tab container and thus to present the encompassed page of application content.

When the web application is presenting in its content pane a first such tab container with its body visible and thus with its encompassed first page of application content visible, if a user clicks on a hyperlink that causes the web application to obtain and present a second page of application content, then the data representation from the server could cause the web browser to present the second page of application content in a second tab container within the web application's content pane, hiding the body of the first tab container and showing the body of the second tab container, and thus the second page of application content, in its place.

As a result, as shown in FIG. 7, once the web application has sequentially presented a number of pages of application content, the web application would be showing within its content pane a current page of application content in the visible body of a tab container, and the web application would have the body of each other tab container hidden but would be showing within the content pane the header of each other tab container. As noted above, each tab container's header could be user-selectable as a hyperlink, to cause the web browser to switch to presenting within the content pane the body of the tab container. Thus, with this form of navigation, a user could easily multi-task back and forth between pages of application content by simply clicking on desired tab-container headers.

As to FIG. 8, with single-page-based navigation, on the other hand, there may be no tab containers in the content pane, as the data representation from the server may cause the browser to present each new page of application content in place of an existing page of application content without maintaining earlier presented pages of application content in tab containers. For instance, with this navigation mode, the web browser may not maintain presentation within the web application's content pane of tab-container headers that would allow a user to easily multi-task between pages of application content as noted above.

As further noted above, the single-page-based navigation mode could also provide for presentation within the web application of a breadcrumb trail as an ordered list of hyperlinks to earlier presented pages of application content. In an example implementation, single-page-based navigation with presentation of a breadcrumb trail could be deemed a separate navigation-mode setting, as a variation from single-page-based navigation without presentation of a breadcrumb trail. In accordance with this setting, the data representation from the server could cause the web browser to present the breadcrumb trail in a header or other portion of the web application, to enable user to navigate to an earlier-presented page of application content. As explained above, however, the breadcrumb trail would likely not provide the multi-tasking benefit of tab-based navigation, because the breadcrumb trail may be truncated when a user clicks on the hyperlink to an earlier-presented page of application content.

VI. Example Operations

In practice, a web developer could thus develop a web application or version thereof for use by a particular enterprise or user and could configure the web application with a particular navigation-mode setting, possibly taking into account the needs of the target user. When the web developer develops the web application, the developer could do so through an application-builder system as discussed above, which could cause a server to store in a database various interrelated records that define the structure and operation of the web application, including a record of the navigation-mode of the web application as specified by the developer.

When a client device of the particular enterprise or user requests the web application, the sever could then query the database to ascertain structure and operation of the web application, including the navigation-mode setting of the web application, and could deliver to the client a data representation of the web application, such as a set of markup and/or JavaScript code that defines the structure and operation of the web application including the navigation-mode of the application. And a web browser executing on the client device could then use the data representation as a basis to render the web application, including applying the indicated navigation-mode.

Figure 9:
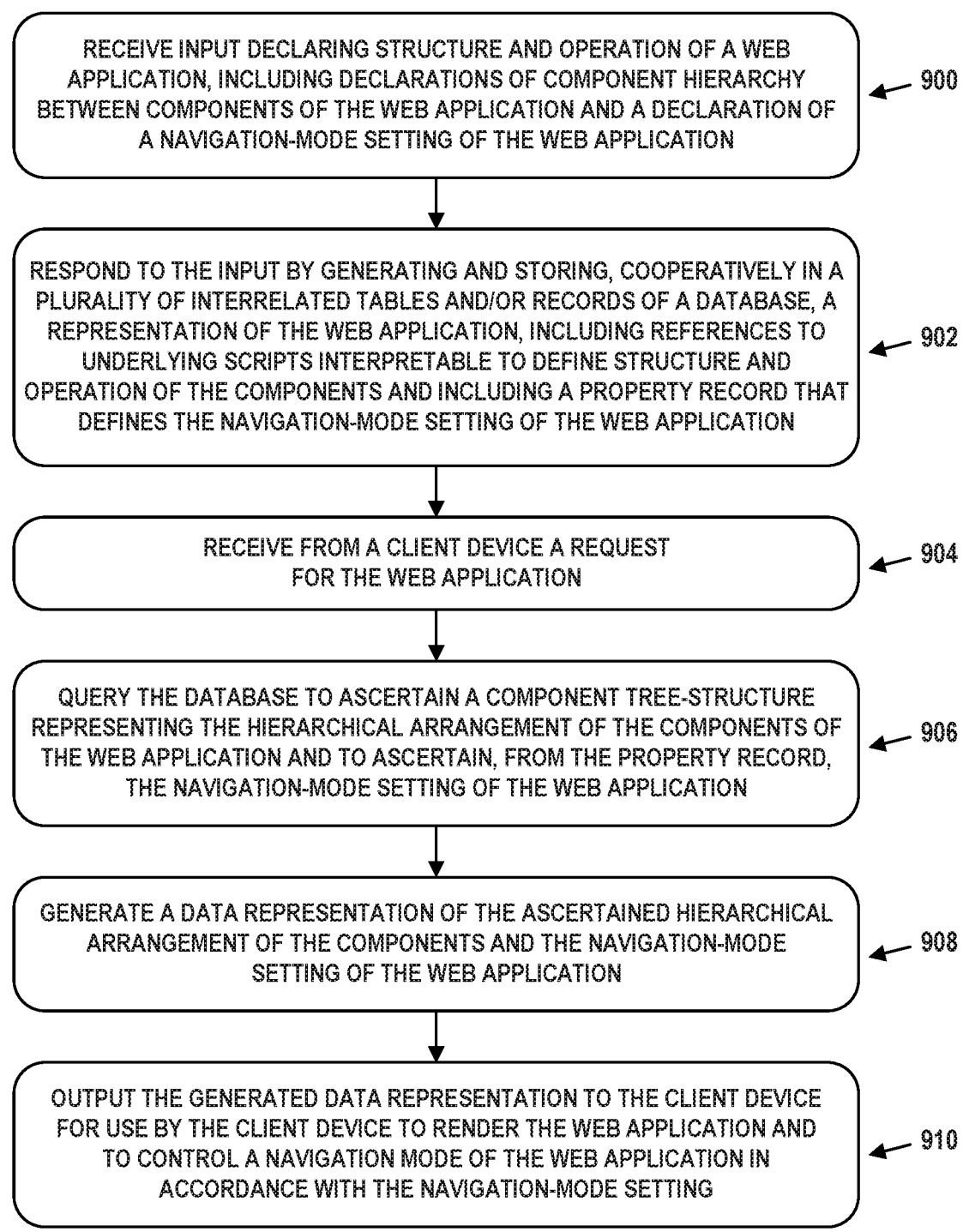
FIG. 9 is a flow chart, in accordance with example embodiments.

FIG. 9 is a flow chart illustrating an example embodiment. The process illustrated by FIG. 9 could be carried out by a computing device, such as computing device 100, and/or a cluster of computing devices, such as server cluster 200. However, some or all aspects of the process could alternatively be carried out by other types of devices or device subsystems. For example, aspects could be carried out by a portable computer, such as a laptop or a tablet device.

The embodiments of FIG. 9 could be simplified by the removal of any one or more of the features shown therein. Further, these embodiments could be combined with features, aspects, and/or implementations of any of the previous figures or otherwise described herein.

As shown in FIG. 9, at block 900, a web server receives input declaring structure and operation of a web application, including declarations of component hierarchy between components of the web application and a declaration of a navigation-mode setting of the web application. Further, at block 902, which could be part of block 900 or could occur before block 900, the web server responds to the input by generating and storing, cooperatively in a plurality of interrelated tables and/or records of a database, a representation of the web application, including references to underlying scripts interpretable to define structure and operation of the components and including a property record that defines the navigation-mode setting of the web application.

At block 904, the web server thereafter receives from a client device a request for the web application. And at blocks 906-908, the web server takes action in response. In particular, at block 906, the web server queries the database to ascertain a component tree-structure representing the hierarchical arrangement of the components of the web application and to ascertain, from the property record, the navigation-mode setting of the web application. At block 908, the server generates a data representation of the ascertained hierarchical arrangement of the components and the navigation-mode setting of the web application, the data representation comprising markup (e.g., HTML) and/or code (e.g., JavaScript). And at block 910, the web server outputs the generated data representation to the client device for use by the client device to render the web application and to control a navigation mode of the web application in accordance with the navigation-mode setting.

As discussed above, the navigation-mode setting in this process controls whether, as the web application presents sequential new pages of application content, the web application operates with tab-based navigation or rather with single-page-based navigation. And operating with tab-based navigation rather than single-page-based navigation could involve (a) presenting each sequential page of application content in a respective tab container having a respective tab header and (b) maintaining earlier presented pages of application content in respective tab containers with tab headers accessibly presented for user selection, allowing a user to multitask back and forth between the pages of application content by selecting associated tab headers. Whereas, operating with single-page-based navigation rather than tab-based navigation could involve presenting each sequential page of application content in place of an existing page of application content without maintaining the existing page of application content in tab container.

In line with the discussion above, the act of presenting the sequential new pages of application content could be responsive to user actuation of hyperlinks presented by the web application.

Further, the navigation-mode setting could further control whether or not the web application, when operating with the single-page-based navigation, presents a page-history breadcrumb linking to one or more past presented pages of application content. Or phrased another way, another navigation mode setting could be single-page-based navigation with presentation of a breadcrumb trail.

As further discussed above, the web server could also be configured to receive user input declaring the structure and operation of the web application, including declarations of the hierarchical arrangement of the components of the web application and, responsive to the user input, to generate and store, cooperatively in a plurality of tables of the database, the plurality of interrelated records cooperatively defining the hierarchical arrangement of the components of the web application, to facilitate the querying and generating. And the web server could also be configured to provide a user interface through which to receive the user input declaring the structure and operation of the web application.

Yet further, as discussed above, the web server could be configured to receive user input declaring the navigation-mode setting of the web application and, responsive to the user input, to generate and store in at least one table of the database the property record defining the navigation-mode setting of the web application. And the web server could be configured to provide a user interface through which to receive the user input declaring the navigation-mode setting of the web application. For instance, the user interface could define a menu enabling user selection of the navigation-mode setting from at least the tab-based navigation and the single-page-based navigation.

VII. Conclusion

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a database containing: a plurality of interrelated records cooperatively defining a hierarchical arrangement of components of a web application, including:
references to underlying scripts interpretable to define a structure and an operation of the components of the web application, and
a navigation-mode setting of the web application, wherein the navigation-mode setting defines whether the web application operates in tab-based navigation or single-page-based navigation; and
a web server configured to:
receive user input declaring the structure and the operation of the web application, including declarations specifying the hierarchical arrangement of the components of the web application;
responsive to receiving the user input, generate and store, cooperatively in a plurality of tables of the database, the plurality of interrelated records cooperatively defining the hierarchical arrangement of the components of the web application; and
receive, from a client device, a request for the web application, and, responsive to the request, (i) query the database to ascertain a component tree-structure representing the hierarchical arrangement of the components of the web application and to ascertain the navigation-mode setting of the web application, (ii) generate a data representation of the ascertained hierarchical arrangement of the components and the navigation-mode setting of the web application, wherein the data representation comprises markup, or code, or both, (iii) generate a document object model (DOM) of the web application in accordance with the data representation, and (iv) output the generated data representation to the client device for use by the client device to render the web application and to control a navigation mode of the web application in accordance with the navigation-mode setting, and
wherein operating with tab-based navigation comprises (a) presenting each new page of application content in a respective tab container having a respective tab header and (b) maintaining earlier presented pages of application content in respective tab containers with tab headers accessibly presented for user selection by maintaining a body of each tab container of the respective tab containers in the DOM of the web application, allowing a user to multitask back and forth between the pages of application content by selecting associated tab headers, and wherein operating with single-page-based navigation comprises presenting a web application header, adjacent to a web application content pane, comprising an ordered list of links to one or more past presented pages of application content.

2. The system of claim 1, wherein presenting each new page of application content is responsive to user actuation of hyperlinks presented by the web application.

3. The system of claim 1, wherein operating with single-page-based navigation comprises presenting each new page of application content in place of an existing page of application content.

4. The system of claim 1, wherein the web server is configured to provide a user interface through which to receive the user input declaring the structure and the operation of the web application.

5. The system of claim 1, wherein the web server is configured to:
receive user input declaring the navigation-mode setting of the web application; and
responsive to the user input, generate and store in at least one table of the database the navigation-mode setting of the web application.

6. The system of claim 5, wherein the web server is configured to provide a user interface through which to receive the user input declaring the navigation-mode setting of the web application.

7. The system of claim 6, wherein the user interface defines a menu enabling user selection of the navigation-mode setting from at least the tab-based navigation and the single-page-based navigation.

8. The system of claim 1, wherein the ordered list of links are ordered based on historical navigation through the one or more past presented pages of application content.

9. A method comprising:
receiving, into a web server, user input declaring a structure and an operation of a web application, including declarations specifying a hierarchical arrangement of components of the web application and a declaration of a navigation-mode setting of the web application, wherein the navigation-mode setting defines whether the web application operates in tab-based navigation or single-page-based navigation;
responsive to receiving the user input, generating and storing, cooperatively in a plurality of tables of a database, a plurality of interrelated records cooperatively defining the hierarchical arrangement of the components of the web application including references to underlying scripts interpretable to define the structure and the operation of the components and including the navigation-mode setting of the web application;
thereafter receiving, into the web server from a client device, a request for the web application; and
responsive to the request, (i) querying the database to ascertain a component tree-structure representing the hierarchical arrangement of the components of the web application and to ascertain the navigation-mode setting of the web application, (ii) generating a data representation of the ascertained hierarchical arrangement of the components and the navigation-mode setting of the web application, wherein the data representation comprises at least one item including markup, or JavaScript, or both, (iii) generating a document object model (DOM) of the web application in accordance with the data representation, and (iv) outputting the generated data representation to the client device for use by the client device to render the web application and to control a navigation mode of the web application in accordance with the navigation-mode setting, and
wherein operating with tab-based navigation comprises (a) presenting each new page of application content in a respective tab container having a respective tab header and (b) maintaining earlier presented pages of application content in respective tab containers with tab headers accessibly presented for user selection by maintaining a body of each tab container of the respective tab containers in the DOM of the web application, allowing a user to multitask back and forth between the pages of application content by selecting associated tab headers, and wherein operating with single-page-based navigation comprises presenting a web application header, adjacent to a web application content pane, comprising an ordered list of links to one or more past presented pages of application content.

10. The method of claim 9, wherein presenting each new page of application content is responsive to user actuation of hyperlinks presented by the web application.

11. The method of claim 9, comprising providing a user interface through which to receive the declaration of the navigation-mode setting of the web application.

12. The method of claim 11, wherein the user interface defines a menu enabling user selection of the navigation-mode setting from at least the tab-based navigation and the single-page-based navigation.

13. An article of manufacture including a non-transitory computer-readable medium, having stored thereon program instructions that, upon execution by a computing system, cause the computing system to perform web server operations comprising:
receiving user input declaring a structure and an operation of a web application, including declarations specifying a hierarchical arrangement of components of the web application and a declaration of a navigation-mode setting of the web application, wherein the navigation-mode setting defines whether the web application operates in tab-based navigation or single-page-based navigation;
responsive to receiving the user input, generating and storing, cooperatively in a plurality of tables of a database, a plurality of interrelated records cooperatively defining the hierarchical arrangement of the components of the web application including references to underlying scripts interpretable to define the structure and the operation of the components and including the navigation-mode setting of the web application;
receiving from a client device a request for the web application; and
responsive to the request, (i) querying the database to ascertain a component tree-structure representing the hierarchical arrangement of the components of the web application and to ascertain the navigation-mode setting of the web application, (ii) generating a data representation of the ascertained hierarchical arrangement of the components and the navigation-mode setting of the web application, wherein the data representation comprises at least one item including markup, or JavaScript, or both, (iii) generating a document object model (DOM) of the web application in accordance with the data representation, and (iv) outputting the generated data representation to the client device for use by the client device to render the web application and to control a navigation mode of the web application in accordance with the navigation-mode setting, and wherein operating with tab-based navigation comprises (a) presenting each new page of application content in a respective tab container having a respective tab header and (b) maintaining earlier presented pages of application content in respective tab containers with tab headers accessibly presented for user selection by maintaining a body of each tab container of the respective tab containers in the DOM of the web application, allowing a user to multitask back and forth between the pages of application content by selecting associated tab headers, and wherein operating with single-page-based navigation comprises presenting a web application header, adjacent to a web application content pane, comprising an ordered list of links to one or more past presented pages of application content.

14. The article of manufacture of claim 13, wherein presenting each new page of application content is responsive to user actuation of hyperlinks presented by the web application.

15. The article of manufacture of claim 14, wherein the operations comprise providing a user interface through which to receive the declaration of the navigation-mode setting of the web application.

16. The article of manufacture of claim 15, wherein the user interface defines a menu enabling user selection of the navigation-mode setting from at least the tab-based navigation and the single-page-based navigation.

17. The article of manufacture of claim 13, wherein the operations comprise providing a user interface through which to receive the user input declaring the structure and the operation of the web application.

* * * * *